US008234854B2

(12) United States Patent
Kesse et al.

(10) Patent No.: US 8,234,854 B2
(45) Date of Patent: Aug. 7, 2012

(54) SYSTEM AND METHOD FOR HEATING A REDUCING AGENT ASSOCIATED WITH A REDUCING AGENT DISTRIBUTION SYSTEM

(75) Inventors: Mary Lou Kesse, Hanna City, IL (US); Sairam P. Thiagarajan, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 587 days.

(21) Appl. No.: 12/255,942

(22) Filed: Oct. 22, 2008

(65) Prior Publication Data
US 2010/0095653 A1  Apr. 22, 2010

(51) Int. Cl.
*F01N 3/10* (2006.01)
(52) U.S. Cl. .......................................... 60/286; 60/295
(58) Field of Classification Search ............. 60/286, 60/295, 301, 303
See application file for complete search history.

(56) References Cited

U.S. PATENT DOCUMENTS

| 6,063,350 | A | 5/2000 | Tarabulski et al. |
| 6,082,102 | A | 7/2000 | Wissler et al. |
| 6,519,935 | B2 | 2/2003 | Weigl |
| 6,581,374 | B2 | 6/2003 | Patchett et al. |
| 6,681,811 | B2 | 1/2004 | Channing |
| 6,739,126 | B2 | 5/2004 | Huthwohl |
| 6,810,661 | B2 | 11/2004 | Lambert et al. |
| 6,901,748 | B2 | 6/2005 | Gomulka |
| 7,293,408 | B2 | 11/2007 | Kohler et al. |
| 2007/0079599 | A1 | 4/2007 | Osaku et al. |
| 2007/0092413 | A1 | 4/2007 | Hirata et al. |
| 2007/0163232 | A1 | 7/2007 | Ueno |
| 2007/0251226 | A1* | 11/2007 | Kaneko ........................ 60/317 |
| 2010/0172763 | A1* | 7/2010 | Habumuremyi ............ 417/32 |

FOREIGN PATENT DOCUMENTS
JP   2005315206 A  * 11/2005

OTHER PUBLICATIONS
U.S. Appl. No. 12/070,498, filed Feb. 19, 2008, Mokire et al.

* cited by examiner

*Primary Examiner* — Thomas Denion
*Assistant Examiner* — Jonathan Matthias
(74) *Attorney, Agent, or Firm* — Finnegan, Henderson, Farabow, Garrett & Dunner LLP

(57) ABSTRACT

A system for heating a reducing agent associated with a reducing agent distribution system. The system may include a reducing agent containment device, a distribution device connected to the reducing agent containment device, and at least one heating component associated with the reducing agent containment device. A temperature sensor may be configured to determine a temperature of the reducing agent and may be disposed at least partially within the reducing agent containment device. A pressure sensor may be associated with the distribution device and configured to determine a pressure characteristic of the system. A controller may be configured to receive input from the temperature sensor and the pressure sensor and configured to send input to the at least one heating component based on the input received from the temperature sensor and the pressure sensor.

18 Claims, 2 Drawing Sheets

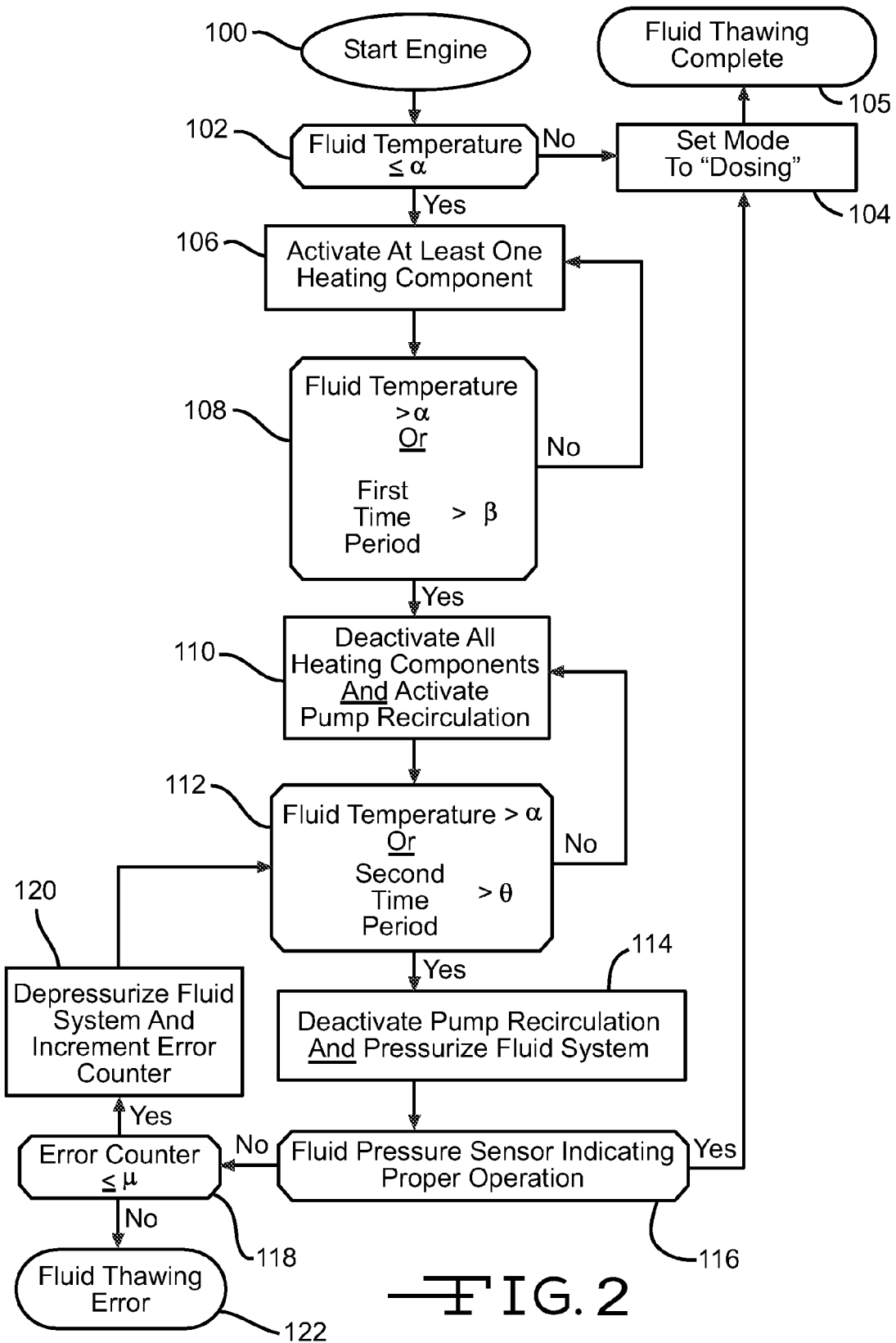

SYSTEM AND METHOD FOR HEATING A REDUCING AGENT ASSOCIATED WITH A REDUCING AGENT DISTRIBUTION SYSTEM

TECHNICAL FIELD

The present disclosure relates to a system and method for heating a fluid associated with an aftertreatment system, and, more particularly, to a system and method for heating a reducing agent disposed in a tank and in various supply lines in a reducing agent distribution system of an aftertreatment system associated with an engine.

BACKGROUND

Internal combustion engines, including diesel engines, gasoline engines, gaseous fuel-powered engines, and other engines known in the art exhaust a complex mixture of air pollutants. These air pollutants are composed of gaseous compounds, such as, for example, the oxides of nitrogen (NOx). Due to increased awareness of the environment, exhaust emission standards have become more stringent, and the amount of NOx emitted from an engine may be regulated depending on the type of engine, size of engine, and/or class of engine. In order to ensure compliance with the regulation of these compounds, some engine manufacturers have implemented a strategy called Selective Catalytic Reduction (SCR) as part of an aftertreatment system. SCR is a process where a gaseous or liquid reductant or reducing agent, e.g., a urea/water solution, diesel fuel, or other hydrocarbon source, is added to the exhaust gas stream of an engine and absorbed onto a catalyst. The reducing agent reacts with NOx in the exhaust gas to form $H_2O$ and $N_2$, thereby reducing harmful emissions. The reducing agent is typically stored in a tank that has at least one supply line for providing the reducing agent to the exhaust stream.

Engines are often used in machines or in stationary applications that are located in extreme cold temperature environments. The cold temperature environments are particularly harsh on an engine when the engine is shut off over extended periods of time, such as overnight or longer periods of shutdown. In cold temperature environments, for example, when the ambient air temperature is less than $-11°$ C., the reducing agent may freeze, either in the tank and/or in the supply line. In view of increased demands of exhaust emission standards, the reducing agent needs to be liquefied such that the exhaust stream receives the required dosage of reducing agent from the tank. Furthermore, the reducing agent needs to be liquefied within a certain time period after engine starting to ensure that the engine meets the exhaust emission standards within a certain amount of time after engine starting.

One system for heating a reducing agent is described in U.S. Patent Application Publication No. 2007/0079599 (the '599 application), published on Apr. 12, 2007 in the name of Osaku et al. and assigned to Nissan Diesel Motor Co., Ltd. The '599 application discloses a system that uses cooling water from an engine as a heat carrier to heat urea water in a urea storage tank via a heat exchanger pipe routed through the urea storage tank. Although the system disclosed in the '599 application may provide a system for heating a reducing agent, the system does not address how to utilize such a system. For example, the control scheme for the apparatus of the '599 application is silent regarding when and how to use the heating system disclosed therein. Thus, the system of the '599 application is deficient in terms of efficiency and diagnostic capabilities.

The disclosed system is directed to addressing the desire to have a control system for ensuring that a liquefied reducing agent is available shortly after the start-up of the engine, or, alternatively, for ensuring that an operator is aware of a reducing agent deficiency.

SUMMARY

In one aspect, the present disclosure is directed toward a system for heating a reducing agent associated with a reducing agent distribution system, including a reducing agent containment device; a distribution device connected to the reducing agent containment device; at least one heating component associated with the reducing agent containment device; a temperature sensor configured to determine a temperature of the reducing agent, the temperature sensor disposed at least partially within the reducing agent containment device; a pressure sensor associated with the distribution device, the pressure sensor configured to determine a pressure characteristic of the system; and a controller configured to receive input from the temperature sensor and the pressure sensor and configured to send input to the at least one heating component based on the input received from the temperature sensor and the pressure sensor.

In another aspect, the present disclosure is directed toward a method for heating a reducing agent associated with a reducing agent distribution system, the method including the steps of determining a temperature of the reducing agent; activating at least one heating component if the temperature of the reducing agent is less than or equal to a threshold temperature value; identifying a pressure of the reducing agent within a distribution device associated with the system; and dosing the reducing agent to an exhaust stream of the aftertreatment system if the pressure of the reducing agent satisfies a threshold requirement.

In yet another aspect, the present disclosure is directed toward a method for heating a reducing agent associated with a reducing agent distribution system, the method including the steps of activating at least one heating component associated with the reducing agent; pressurizing the system; evaluating a status of the pressurized system; and dosing a quantity of the reducing agent to a portion of the aftertreatment system if the status is satisfactory.

BRIEF DESCRIPTION OF THE DRAWINGS

FIG. 2 is a diagrammatic illustration of a flow chart representing a control strategy according to an exemplary embodiment of the present disclosure.

DETAILED DESCRIPTION

Figure 1:
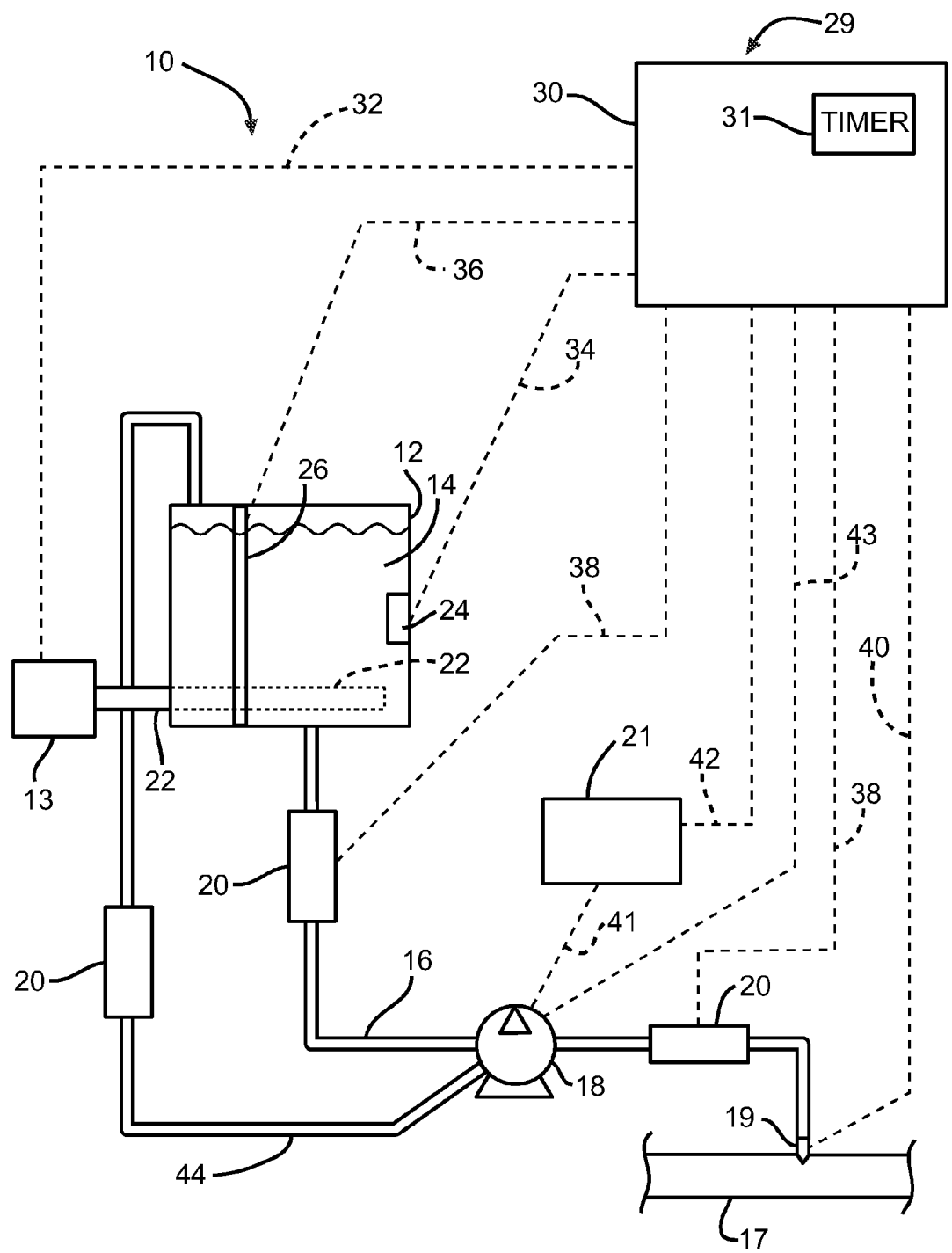
FIG. 1 is a schematic view of a reducing agent distribution system according to an exemplary embodiment of the present disclosure.

FIG. 1 illustrates a schematic view of a reducing agent distribution system 10, which forms a portion of an exhaust aftertreatment system for an engine (not shown). The aftertreatment system may be configured to direct exhaust gas from the engine to the atmosphere and to reduce the amount of certain exhaust gas constituents within the expelled exhaust gas. In one example, nitrogen oxide (NOx) within the exhaust gas passes through a catalyst which is configured to react with a reducing agent mixed with the exhaust gas to convert NOx into $N_2$ and other less harmful byproducts, such as $O_2$. The system 10 may include a reducing agent 14 housed in a reducing agent tank or containment device 12. The reducing agent 14 may include, for example, an urea/water solution, ammonia, ADBLUE® solution ADBLUE® is a registered trademark of the Verband Der Automobilindustrie E.V. (VDA) Association of Germany), diesel fuel, and/or any other hydrocarbon source. The reducing agent 14 is distributed to an exhaust conduit 17 via a reducing agent distribution or supply line 16 and, optionally, a reducing agent pump or distribution device 18. A reducing agent injector 19 may be disposed proximate the exhaust conduit 17 to inject the reducing agent 14 into an exhaust gas stream in the exhaust conduit 17. Although shown as a single injector, the reducing agent injector 19 may be formed as a manifold to facilitate distribution of the reducing agent 14 into the exhaust gas stream, or, alternatively, the system 10 may include a plurality of reducing agent injectors 19 disposed proximate the exhaust conduit 17. A reducing agent pressure sensor 21 may be associated with the reducing agent pump 18 to monitor the pressure of the reducing agent 14 in the system 10. At least one line heating component 20, which may include a wound-wire heating element, may be circumferentially disposed around the reducing agent supply line 16 either upstream or downstream of the pump 18 to prevent freezing of the reducing agent 14 disposed in the reducing agent supply line 16. The line heating component 20 may also be formed as a long, cable-like electric heating element which is wrapped around the reducing agent supply line 16, or as a thermal insulator which covers the reducing agent supply line 16 to melt frozen reducing agent 14 contained therein and/or to prevent freezing of the reducing agent 14 contained therein. The line heating component 20 may also include a structure that allows engine coolant to circulate around the outside of an electrical conductor.

Referring still to FIG. 1, the system 10 may also include at least one engine coolant line 22 extending into the tank 12. In an exemplary embodiment, the engine coolant line 22 enters the tank 12, completes a loop inside of tank 12 near the bottom thereof, and exits the tank 12 for return to an engine coolant source 13. The engine coolant line 22 may be formed as stainless steel tubing, or any other material that does not corrode or deteriorate in a urea environment. The heat transfer provided from the engine coolant within the engine coolant line 22 facilitates warming and/or thawing of the reducing agent 14, as described below. Positioning the engine coolant line 22 near a portion of the tank 12 from which the reducing agent supply line 16 extends facilitates thawing or warming of a portion of the reducing agent 14 closest to the supply line 16. The reducing agent tank 12 also may include at least one reducing agent temperature sensor 24 positioned in the reducing agent tank 12. In an exemplary embodiment, the reducing agent temperature sensor 24 is submerged in the reducing agent 14. The sensor 24 is positioned a sufficient distance from the engine coolant line 22 such that the sensor 24 does not detect the temperature of the engine coolant, but instead only detects the temperature of the reducing agent 14. In an alternative embodiment, the reducing agent temperature sensor 24 could be replaced with an ambient air temperature sensor or may work in conjunction with an ambient air temperature sensor. The system 10 further includes a tank heating component 26, such as an electric heater, disposed within the reducing agent tank 12 and at least partially immersed in the reducing agent 14.

FIG. 1 further illustrates a control system 29 for controlling operation of the engine coolant line 22, the line heating component(s) 20, and the tank heating component 26. The control system 29 may include a controller 30 which receives inputs from any or all of the engine coolant source 13 via communication line 32, the reducing agent temperature sensor 24 via communication line 34, the tank heating component 26 via communication line 36, the line heating component(s) 20 via communication line(s) 38, the reducing agent injector 19 via communication line 40, the reducing agent pump 18 via communication line 43, and the reducing agent pressure sensor 21 via communication line 42. Based on the inputs received, the controller 30 may provide control signals to the engine coolant source 13, the tank heating component 26, and the line heating component(s) 20. The sensors 24, 21 may be configured to generate input signals indicative of temperatures of the reducing agent 14 and the pressure of the reducing agent 14, respectively. For example, given inputs from the sensors 24, 21, the controller 30 may operate one or all of the engine coolant source 13, the tank heating component 26, and the line heating component(s) 20 by sending control signals via communication lines 32, 36, and 38, respectively, to facilitate thawing the reducing agent 14. Although described throughout as individual communication lines, one or more of the communication lines discussed herein may be part of a single datalink connection between various sensors and actuators in the control system 29.

Alternatively, the command to operate one or all of the engine coolant source 13, the tank heating component 26, and the line heating component(s) 20 may be received by way of an operator input device (not shown), which may be in communication with controller 30 via a communication line (not shown). For example, an operator may activate the input device without operating the engine associated with the reducing agent system 10. This may be desirable when the operator knows that the temperature conditions are such that at least a portion of the reducing agent 14 is frozen. In such a situation, the controller 30 may be powered via a battery (not shown) associated with the engine or machine on which the engine is positioned.

Controller 30 may embody a single microprocessor or multiple microprocessors that include means for controlling an operation of the engine coolant source 13, the tank heating component 26, and the line heating component(s) 20. Numerous commercially available microprocessors can perform the functions of controller 30. It should be appreciated that controller 30 could readily embody a general engine control unit (ECU) capable of controlling numerous functions associated with the engine and/or an associated machine (not shown). Controller 30 may include all of the components required to run an application such as, for example, a memory, a secondary storage device, and a processor, such as a central processing unit or any other means known in the art for controlling the engine coolant source 13, the tank heating component 26, and the line heating component(s) 20. Various other known circuits may be associated with controller 30, including power supply circuitry, signal-conditioning circuitry, solenoid driver circuitry, communication circuitry, and other appropriate circuitry. Controller 30 may analyze and compare received and stored data, and, based on instructions and data stored in memory or input by a user, determine whether action is required. For example, controller 30 may compare received values with target values stored in memory, and, based on the results of the comparison, controller 30 may transmit signals to one or more systems to alter the operating status thereof.

Controller 30 may include any memory device known in the art for storing data relating to operation of the engine coolant source 13, the tank heating component 26, and the line heating component(s) 20. The data may be stored in the form of one or more maps that describe and/or relate operation of the engine coolant source 13, the tank heating component 26, and the line heating component(s) 20. Each of these maps may be in the form of tables, graphs, and/or equations, and include a compilation of data collected from lab and/or field operation of the engine coolant source 13, the tank heating component 26, and the line heating component(s) 20. The maps may be generated by performing instrumented tests on the operation of the engine coolant source 13, the tank heating component 26, and the line heating component(s) 20 under a variety of operating conditions while varying parameters associated therewith. Controller 30 may also be capable of updating the maps based on measured operating conditions, which may allow controller 30 to adjust the maps to match the particular operating characteristics and modes of an exemplary engine. Controller 30 may reference these maps and control the operation of one component in response to the desired operation of a second component. The maps may contain data on, for example, the time required for various components of system 10 to be active before controller 30 activates the engine coolant source 13, the tank heating component 26, and/or the line heating component(s) 20.

Controller 30 may also include a timer 31. Controller 30 may be configured to couple information from the timer 31 with information from other sources. For example, controller 30 may utilize information from the timer 31 in conjunction with information regarding operation of the engine coolant source 13, the tank heating component 26, and the line heating component(s) 20 to determine how long and when the engine coolant source 13, the tank heating component 26, and the line heating component(s) 20 are operated. The timer 31 may also be used to monitor and control duration of heating events or any other operating parameters of system 10.

Controller 30 may be configured to activate the engine coolant source 13, the tank heating component 26, and/or the line heating component(s) 20 based on one or more inputs commonly known in the art and the maps stored in the memory of controller 30. For example, controller 30 may monitor inputs from any or all of the engine coolant source 13, the reducing agent temperature sensor 24, the tank heating component 26, the line heating component(s) 20, the reducing agent injector 19, the reducing agent pump 18, and the reducing agent pressure sensor 21 via the respective communication lines, as well as operator input received via the operator input device or interface, and, based on the data contained in the maps, determine that heating is required for at least a portion of system 10. Based on this determination, controller 30 may activate one or more of the engine coolant source 13, the tank heating component 26, and/or the line heating component(s) 20 to facilitate distribution of heat to the reducing agent 14. Controller 30 may then monitor the operating status of system 10 as well as the inputs from the engine coolant source 13, the reducing agent temperature sensor 24, the tank heating component 26, the line heating component(s) 20, the reducing agent injector 19, the reducing agent pump 18, and the reducing agent pressure sensor 21, to determine, for example, the duration of activation of one or more of the engine coolant source 13, the tank heating component 26, and/or the line heating component(s) 20.

Controller 30 may be configured to activate the engine coolant source 13, the tank heating component 26, and/or the line heating component(s) 20 in response to one or more trigger conditions commonly known in the art and as described below. Activation of the engine coolant source 13, the tank heating component 26, and/or the line heating component(s) 20 may also be initiated manually at the operator interface, such as via a switch, button, or the like associated with the operator interface, and/or a service tool configured to interface with controller 30 and/or system 10.

FIG. 2 illustrates a control strategy, which may be implemented in the controller 30 (FIG. 1). The control strategy begins with step 100 in which an operator starts an engine equipped with the system 10. At step 102, the controller 30 receives an input via the communication line 34 from the reducing agent temperature sensor 24 and determines whether the fluid temperature of the reducing agent 14 is less than or equal to $\alpha$. In one embodiment, $\alpha$ is approximately equal to $-11°$ C., which is a typical freezing point for a 32.5% aqueous urea solution. The value of $\alpha$ may be different depending on what type of reducing agent solution is utilized. Controller 30 may use a concentration detecting device (not shown) to detect the concentration of the reducing agent solution of the reducing agent 14 and thereby determine the value for $\alpha$. For example, the value of $\alpha$ may be higher if the reducing agent concentration is higher, such as a 40% aqueous urea solution. If the fluid temperature is greater than $\alpha$, the control strategy continues to step 104 which sets the mode to "dosing", i.e., the controller 30 sends a signal via the communication line 43 to the reducing agent pump 18 and the communication line 40 to the reducing agent injector 19 to initiate pumping of the reducing agent 14 through the reducing agent supply line 16 and injecting of the reducing agent 14 into the exhaust conduit 17. Once the mode has been set to "dosing", the fluid thawing is complete as illustrated via step 105.

If the fluid temperature of the reducing agent 14 is less than or equal to $\alpha$, the control strategy proceeds to step 106 in which the controller 30 sends control signals to activate at least one of the engine coolant line 22, the tank heating component 26, and the line heating component(s) 20 via the communication lines 32, 36, 38, respectively. At step 106, a first start time is recorded in timer 31 of controller 30 to monitor the length of operation of the engine coolant line 22, the tank heating component 26, and the line heating component(s) 20, i.e., a first time period. Depending on the time period required in which the reducing agent 14 needs to be thawed, the controller 30 may selectively operate one or more of the engine coolant line 22, the tank heating component 26, and the line heating component(s) 20. For example, if there is no set time period, the controller 30 may only activate the engine coolant line 22 which, after some time period, will sufficiently thaw the reducing agent 14 via heat produced by the associated engine. However, if there is a set time period for which the engine needs liquid reducing agent 14, such as thirty minutes, the controller 30 may first activate the tank heating component 26 and the line heating component(s) 20 until the engine warms sufficiently to provide warm engine coolant to the engine coolant line 22, which is then activated to provide further warming capabilities to the system 10. Activation of the engine coolant line 22 causes the engine coolant source 13 to provide engine coolant from the engine to circulate through and/or proximate the reducing agent tank 12. Activation of the tank heating component 26 causes a power source (not shown) to provide power to the tank heating component 26, thereby warming the reducing agent 14 proximate the tank heating component 26. In one embodiment, the tank heating component 26 is an electric heater. As the tank heating component 26 warms up the reducing agent 14, the warmed reducing agent 14 begins to proliferate throughout the remainder of the tank 12, thereby facilitating further warming of the reducing agent 14. Activation of the line heating component(s) 20 causes any frozen reducing agent 14 in the supply line 16 to thaw and prevents any reducing agent 14 in the supply line 16 from freezing. Additionally, a warmed reducing agent conduit 44 may be provided from the reducing agent pump 18 which may optionally pump warmed reducing agent 14 (which has been warmed via at least one of the engine coolant line 22, the tank heating component 26, and the line heating component 20 upstream of reducing agent pump 18) back into the top of the reducing agent tank 12 and distributes warmed reducing agent 14 onto the top of any frozen reducing agent 14 remaining in the reducing agent tank 12, thereby further facilitating warming and/or thawing of the reducing agent 14 in the reducing agent tank 12. In one embodiment, a line heating component 20 may be disposed around the reducing agent conduit 44.

In step 108, the controller 30 periodically monitors signal inputs from the reducing agent temperature sensor 24 until the sensor 24 indicates that the temperature of the reducing agent 14 is greater than $\alpha$, or the timer 31 indicates that the first time period is greater than a value $\beta$. The value for $\beta$ may depend on the size and shape of the reducing agent tank 12, the properties of which may be contained in the memory of the controller 30. In one embodiment, the value of $\beta$ is between approximately 10 and 15 minutes. Once the controller 30 identifies that the reducing agent 14 is greater than $\alpha$, or the first time period is greater than $\beta$, the engine coolant line 22, the tank heating component 26, and the line heating component(s) 20 are deactivated in step 110. In one embodiment, the line heating component(s) 20 may remain activated after step 110 until dosing is successful. Moreover, the reducing agent pump 18 is activated via a control signal sent from controller 30 to the reducing agent pump 18 via communication line 43, thereby initiating pump recirculation of the reducing agent 14 into the conduit 44 for recirculation back to the reducing agent tank 12. At step 110, a second start time is recorded in timer 31 of controller 30 to monitor the length of operation of the reducing agent pump 18 in the recirculation mode, i.e., a second time period.

The control strategy continues to step 112 at which point the controller 30 again determines whether the fluid temperature of the reducing agent 14 is greater than $\alpha$, or the timer 31 indicates that the second time period is greater than a value $\theta$. If either of these conditions is true, the controller 30 deactivates the pump recirculation and pressurizes the system 10 in step 114 via methods known in the art. If both of these conditions are false, the pump recirculation continues until either of the conditions becomes true. Once the system 10 is pressurized, the controller 30 determines in step 116 whether proper operation of the system 10 is occurring. To make this determination, the reducing agent pressure sensor 21 associated with the reducing agent pump 18 senses the pressure of the reducing agent 14 in the reducing agent pump 18. If the pressure of the reducing agent 14 indicates that the reducing agent 14 is liquefied, then the pressure sensor 21 sends a signal via communication line 42 to the controller 30 indicating proper operation of the system 10. In another embodiment, a NOx gas sensor (not shown) may be located in the exhaust conduit 17 to determine if NOx conversion is occurring and, hence, that the system 10 is providing sufficient reducing agent 14 to the exhaust gas stream. The NOx sensor may be used if the pressure sensor 21 is not functioning or unavailable. The control strategy then moves to step 104, as described above, to set the mode to "dosing". If the pressure of the reducing agent 14 indicates that the reducing agent 14 is not liquefied, then the pressure sensor 21 sends a signal via communication line 42 to the controller 30 indicating improper operation of the system 10. The improper operation of the system 10 may occur because there is not a sufficient amount of the reducing agent 14 thawed, e.g., because the engine has not been activated long enough and/or the use rate of the reducing agent 14 is greater than the thaw rate of the reducing agent 14. The control strategy then moves to step 118 at which time the controller 30 determines whether the value of an error counter is less than a threshold value $\mu$. In one embodiment, the value of $\mu$ is equal to three. If the value of the error counter is less than or equal to $\mu$, the control strategy continues to step 120 in which the system 10 is depressurized and the error counter is incremented by one, after which the control strategy returns to step 112. If the value of the error counter is greater than $\mu$, the control strategy continues to step 122 in which the controller 30 receives a signal that there is a reducing agent or fluid thawing error. This signal may be a diagnostic code for a service tool application and/or a dashboard light in the machine (not shown) utilizing the system 10, such as those required for on-board diagnostic applications.

The controller 30 monitors inputs from the reducing agent temperature sensor 24 and other sensors associated with system 10, such as an ambient air temperature sensor (not shown), throughout the duration of engine use and provides control signals to the engine coolant line 22, the tank heating component 26, and the line heating component(s) 20 as necessary to initiate the control strategy outlined above to facilitate heating of the reducing agent 14. For example, during use of the engine, if the ambient air temperature or the reducing agent temperature falls below or equal to $\alpha$, the controller 30 may start the control strategy at step 102 to ensure that the reducing agent 14 does not freeze.

INDUSTRIAL APPLICABILITY

The disclosed reducing agent heating system and method may be applicable to any engine operating in extreme cold environments, such as engines used with on-highway trucks, construction equipment, mining equipment, and power generation equipment, for example. The reducing agent heating system and method provides a control strategy for maintaining reducing agent in a liquefied form such that emission control may be promoted efficiently. Although described throughout as a reducing agent heating system, the principles and methods of the present disclosure could also be applied to any other vehicle-mounted fluid which may be housed in a tank or other containment device.

In operation, at least one of the engine coolant line 22 and the tank heating component 26 may heat frozen or freezing reducing agent 14 to return the reducing agent 14 to a liquid state in the reducing agent tank 12. Moreover, the line heating component(s) 20 may heat frozen or freezing reducing agent 14 to return the reducing agent 14 to a liquid state in the reducing agent supply line 16. The controller 30 provides a control strategy which uses a pressure sensor 21 to determine whether the system 10 is properly pressurized, i.e., the pressure sensor 21 provides a method to determine whether the reducing agent 14 is sufficiently thawed to provide sufficient emission control from system 10. The closed loop control strategy uses the temperature of the reducing agent 14 and time periods to ensure that the heating components of the system 10 are only used when necessary to minimize power and heat rejection losses.

It will be apparent to those skilled in the art that various modifications and variations can be made to the disclosed reducing agent heating system and method without departing from the scope of the disclosure. Other embodiments of the reducing agent heating system and method will be apparent to those skilled in the art from consideration of the specification and practice of the reducing agent heating system and method disclosed herein. It is intended that the specification and examples be considered as exemplary only, with a true scope of the disclosure being indicated by the following claims and their equivalents.

What is claimed is:

1. A system for heating a reducing agent associated with a reducing agent distribution system, comprising:
 a reducing agent containment device;
 a distribution device connected to the reducing agent containment device and configured to dose a quantity of reducing agent to an exhaust conduit;
 at least one heating component associated with the reducing agent containment device;
 a temperature sensor configured to determine a temperature of the reducing agent, the temperature sensor disposed at least partially within the reducing agent containment device;
 a pressure sensor associated with the distribution device, the pressure sensor configured to determine a pressure characteristic of the system;
 a recirculation line disposed between the distribution device and the reducing agent containment device; and
 a controller configured to receive input from the temperature sensor and the pressure sensor and configured to send input to the at least one heating component based on the input received from the temperature sensor and the pressure sensor
 the controller being further configured to measure a first time period and activate the recirculation line based on the first time period exceeding a threshold and before any reducing agent is dosed to the exhaust conduit.

2. The system of claim 1, wherein the distribution device includes a reducing agent pump.

3. The system of claim 1, wherein the temperature sensor is disposed at least partially within the reducing agent contained in the reducing agent containment device.

4. The system of claim 1, wherein the first time period is associated with operation of the at least one heating component.

5. The system of claim 1, wherein the at least one heating component includes at least one of an engine coolant line, a containment device heating component, and a line heating component.

6. A method for heating a reducing agent associated with a reducing agent distribution system, the method comprising the steps of:
 activating at least one heating component associated with the reducing agent;
 pressurizing the system;
 evaluating a status of the pressurized system;
 recirculating heated reducing agent through the system if the status is unsatisfactory; and
 dosing a quantity of the reducing agent to a portion of the aftertreatment system only if the status is satisfactory.

7. The method of claim 6, further including the step of recirculating the reducing agent after the activating step.

8. The method of claim 7, further including the step of measuring a time period associated with the recirculating step.

9. The method of claim 6, further including the step of deactivating the at least one heating component.

10. The method of claim 9, further including the step of measuring a time period between the activating step and the deactivating step.

11. The method of claim 6, further including the step of incrementing an error counter if the status is unsatisfactory.

12. A method for heating a reducing agent associated with a reducing agent distribution system, the method comprising the steps of:
 determining a temperature of the reducing agent;
 activating at least one heating component if the temperature of the reducing agent is less than or equal to a threshold temperature value;
 recirculating heated reducing agent on top of frozen reducing agent before dosing the reducing agent to an exhaust stream of an aftertreatment system;
 identifying a pressure of the reducing agent within a distribution device associated with the system; and
 dosing the reducing agent to the exhaust stream of the aftertreatment system if the pressure of the reducing agent satisfies a threshold requirement.

13. The method of claim 12, further including the step of measuring a time period associated with the recirculating step.

14. The method of claim 12, further including the step of deactivating the at least one heating component.

15. The method of claim 14, further including the step of measuring a time period between the activating step and the deactivating step.

16. The method of claim 12, further including the step of pressurizing the system prior to the identifying step.

17. The method of claim 12, further including the step of incrementing an error counter if the pressure of the reducing agent does not satisfy the threshold requirement.

18. The method of claim 12, wherein the activating step includes activating at least one of an engine coolant line, a containment device heating component, and a line heating component.

* * * * *